United States Patent

Goodwin

[15] 3,677,356
[45] July 18, 1972

[54] WEIGHING APPARATUS FOR LIQUIDS

[72] Inventor: Zeno E. Goodwin, P.O. Box 2354, Morgan City, La. 70380

[22] Filed: Aug. 6, 1971

[21] Appl. No.: 169,720

[52] U.S. Cl.............................177/190, 177/207, 177/208
[51] Int. Cl......................G01g 1/22, G01g 5/02, G01g 5/04
[58] Field of Search.........................177/190, 194, 207–209, 177/141

[56] References Cited

UNITED STATES PATENTS

| 46,992 | 3/1865 | Clum | 177/207 |
| 1,878,179 | 9/1932 | Rawling | 177/208 |

FOREIGN PATENTS OR APPLICATIONS

| 942 | 2/1900 | Austria | 177/208 |
| 508,473 | 7/1920 | France | 177/207 |
| 748,744 | 5/1956 | Great Britain | 177/207 |
| 983,083 | 2/1965 | Great Britain | 177/208 |
| 598,989 | 10/1959 | Italy | 177/207 |
| 245,401 | 3/1970 | U.S.S.R. | 177/208 |

Primary Examiner—Robert S. Ward, Jr.
Attorney—James F. Weiler et al.

[57] ABSTRACT

A weighing apparatus for weighing liquids which includes a balance beam pivotally supported from a pivot pin and having first and second members of equal weight supported on opposite sides of the pivot point, one of the members being adapted to be positioned in the liquid to be measured for displacing a predetermined volume of liquid. A fluid piston and cylinder assembly fixedly supported and in contact with the beam whereby the buoyant force exerted on the one member is transmitted to the fluid assembly and a pressure gauge connected to the assembly for measuring the pressure therein which is an indication of the weight of the liquid in which the one member is inserted. The one member including first and second horizontal sections of different cross-sectional areas with the upper cross-sectional area being smaller whereby the volume of fluid being displaced when the member is inserted in the fluid is accurately measured. The beam including a vertical extending shoulder adjacent the pivot point which is in contact with the fluid assembly thereby multiplying the buoyant force applied by the liquid to the fluid assembly.

7 Claims, 2 Drawing Figures

Patented July 18, 1972

3,677,356

Zeno E. Goodwin
INVENTOR.

BY James F. Wesley
William G. Stout
ATTORNEYS

WEIGHING APPARATUS FOR LIQUIDS

BACKGROUND OF THE INVENTION

It is frequently desired to measure the density or weight of a certain volume of drilling muds, cement slurries, brine solutions or chemical compositions. The concept of measuring the density or the weight of a liquid by its buoyant effect upon a member submered therein is old. The present invention is directed to various improvements in which the buoyant effect of the fluid acting on a submerged body is used to directly actuate a piston and cylinder assembly to which a gauge is attached whereby a direct reading of the weight of the liquid can be easily made.

SUMMARY

The present invention is directed to a weighing apparatus for liquids having a balance beam pivotally supported from a pivot pin with first and second members of equal weights supported from the balance beam on opposite sides of the pin and one of which is adapted to be positioned in the liquid for displacing a predetermined volume of liquid. A fluid piston and cylinder assembly is fixedly supported and one of the piston and cylinder is positioned in contact with the beam and adapted to be actuated when the beam is pivoted about the pivot pin due to the buoyant force acting upon the submerged buoyant member. A pressure gauge is connected to the fluid assembly for measuring the pressure therein which is an indication of the weight of the liquid into which the buoyant member is inserted.

Still a further object of the present invention is the provision of an assembly including adjusting means for adjusting the piston and cylinder relative to the beam for zeroing the apparatus in a horizontal position.

Yet a still further object of the present invention is the provision of a weighing apparatus in which the buoyant member submerged into the liquid being measured includes first and second horizontal sections of different cross-sectional areas with the upper cross-sectional area being smaller whereby the volume of fluid being displaced when the buoyant member is submerged therein may be accurately measured.

Yet a still further object of the present invention is the provision wherein the balance beam includes a vertically extending shoulder adjacent the pivot pin and remote from the submerged member which actuates the fluid measuring assembly thereby multiplying the buoyant force applied to the beam by the liquid being measured.

DESCRIPTION OF THE PREFERRED EMBODIMENT

Figure 1:
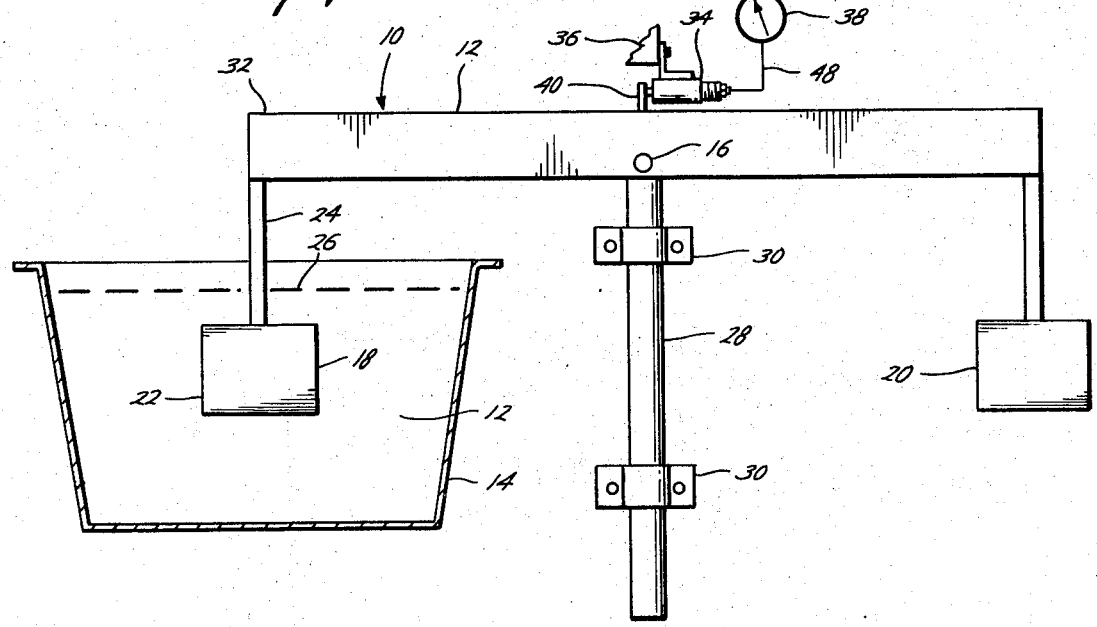
FIG. 1 is an elevational view of the weighing machine of the present invention.

Referring now to the drawing, and particularly to FIG. 1, the reference numeral 10 generally indicates a weighing apparatus for measuring the weight of a liquid 12, such as in a container 14.

The apparatus 10 generally includes a balance beam 12 pivotally supported from a pivot pin 16 and including first and second members 18 and 20 of equal weight suspended from the beam 12 equal distances from the pivot pin 16 and on opposite sides thereof. For convenience and accuracy, the members 18 and 20 may be identical in size, shape and weight thereby counterbalancing each other about the pivot pin 16 so that the balance beam 12 is normally in a horizontally level position. Preferably, the members 18 and 20 include a first section 22 of one horizontal cross section and a second section 24 of a smaller cross-sectional area. A line 26 may be marked on the smaller cross-sectional area section 24 indicating the liquid line to which the body 18 must be submerged to displace a predetermined known volume of liquid. The pivot pin 16 is supported from an adjustable support stand 28 which may be rotatably and vertically adjusted and held in position by holding members 30. Thus, in order to weigh the density of a predetermined volume of the liquid 12 in the container 14, the member 18 is inserted into the liquid up to the liquid line 26 whereby the member 18 displaces a predetermined amount of liquid. Thus the liquid 12 exerts a pressure upwardly on the buoyant member 18 in accordance with the density or weight of the liquid 12.

Thus, as shown in FIG. 1, with the member 18 submerged in the liquid 12 a buoyant force is exerted at the end 32 of the balance beam 12 attempting to move the end 32 upwardly in proportion to the density of the liquid 12. In order to measure the buoyant force exerted by the liquid 12, a fluid piston and cylinder assembly 34 is provided secured to a fixed support 36 and one of the piston and cylinder is positioned in contact with the beam 12 and adapted to be actuated to increase the fluid pressure therein in proportion to the amount of buoyant force exerted by the liquid 12 on the buoyant member 18. A pressure gauge 38 is connected to the fluid piston and cyliner assembly 34 by line 48 and may be calibrated to read the density or weight of the liquid 12 directly.

Preferably, the balance beam 12 includes a shoulder 40 positioned adjacent the pivot pin 16 and away from the member 18 for multiplying the buoyant force applied to the beam 12 by the buoyant member 18. Preferably, the fluid piston and cylinder assembly 34 is hydraulic and thus the fluid therein is substantially incompressible and any force on the balance beam 12 will not substantially move the balance beam 12 out of its level position.

Figure 2:
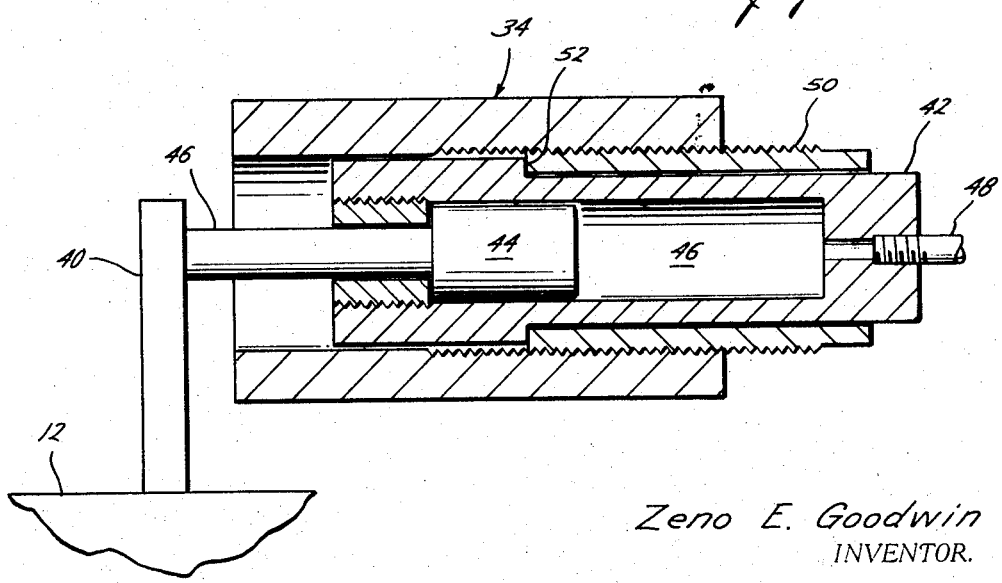
FIG. 2 is an enlarged fragmentary cross-sectional view of the fluid piston and cylinder measuring assembly.

Referring now to FIG. 2, a more detailed view of the fluid piston and cylinder assembly 34 is shown having a main body 40 supported from the support 36 (FIG. 1), a cylinder 42, and a piston 44 slidable therein with a piston rod 46 extending exteriorly of the cylinder 42 for engagement by the shoulder 40. Thus, as the balance beam 12 is subjected to a buoyant force, the shoulder 40 presses on the piston rod 46 and piston 44 increasing the pressure on the fluid 46 in the cylinder 42 which is transmitted through line 48 to the pressure gauge 38. An adjusting sleeve 50 is provided threadedly secured to the body 40 and abutting a shoulder 52 of the cylinder 42 whereby the cylinder 42 and piston 44 may be moved relative to the shoulder 40 for assisting and adjusting the position of the position of the piston rod 46 when zeroing the instrument. Thus, the fluid piston and cylinder assembly 34 is horizontally adjustable to move in and out to receive an applied force from the shoulder 40 when the balance beam 12 is in a level position.

Thus, in use the balance beam 12 may be vertically and rotatably adjusted on the support stand 28 and inserted into the liquid 12 down to the liquid level line 26 whereby a known volume of liquid is displaced by the submerged buoyant member 18. The displacement of liquid 12 creates a force equal to the weight of the liquid displaced. This force is applied against the end 32 of the balance beam 12 and multiplied about the pivot point 16 and applied by the shoulder 40 to the fluid piston and cylinder assembly 34 to increase the hydraulic pressure therein to actuate the gauge to read directly the weight of the liquid 12.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. A weighing apparatus for liquids comprising,
a pivot pin,
a balance beam pivotally supported from the pin,
first and second members of equal weight supported from the balance beam on opposite sides of the pin, one of which is adapted to be positioned in the liquid to be measured for displacing a predetermined volume of liquid, a fluid piston and cylinder assembly, said assembly fixedly supported and one of the piston and cylinder positioned in contact with the beam whereby the pressure in the assembly is increased when said one member is submerged into the liquid, and a pressure gauge connected to the assembly for measuring the pressure therein thereby indicating the the weight of the liquid into which the one buoyant member is inserted.

2. The apparatus of claim 1 wherein said one member includes first and second horizontal sections of different cross-sectional areas, the upper cross-sectional area being smaller whereby the volume of fluid being displaced when the member is inserted into the fluid is accurately measured.

3. The apparatus of claim 1 wherein the beam includes a vertically extending shoulder adjacent the pivot pin which is in contact with the assembly thereby multiplying the buoyant force applied to the beam by the liquid.

4. The apparatus of claim 1 including a vertically adjustable and rotatable support connected to the pivot pin for supporting the beam.

5. The apparatus of claim 1 including means for adjusting the piston and cylinder relative to the beam.

6. A weighing apparatus for liquids comprising, a pivot pin, a balance beam pivotally supported from the pin, first and second buoyant members of equal weight supported from the balance beam on opposite sides of the pin, one of which is adapted to be positioned in the liquid for displacing a predetermined volume of liquid, said beam including a shoulder adjacent the pivot pin for multiplying the buoyant force applied to the beam by the liquid when said one member is inserted into the liquid, a fluid piston and cylinder assembly, said assembly fixedly supported and one of the piston and cylinder positioned in contact with the beam shoulder whereby the pressure in the assembly is increased when said one member is submerged into the liquid, a pressure gauge connected to the assembly for measuring the pressure therein thereby indicating the weight of the liquid which is displaced by the one buoyant member, a vertically adjustable support connected to the pivot pin for supporting the beam, and said one buoyant member including first and second horizontal sections of different cross-sectional areas, the upper cross-sectional area being smaller whereby the volume of fluid being displaced when the member is inserted into the fluid is accurately measured.

7. The apparatus of claim 6 including, means for adjusting the position of the piston and cylinder assembly relative to the beam shoulder.

* * * * *